United States Patent
Schulz et al.

(10) Patent No.: US 7,176,408 B2
(45) Date of Patent: Feb. 13, 2007

(54) METHOD FOR LASER-CUTTING STRUCTURAL COMPONENTS TO BE JOINED

(75) Inventors: Wolfgang Schulz, Langerwehe (DE); Jan Michel, Aachen (DE); Peter Abels, Alsdorf (DE); Gerhard Alber, Ravensburg (DE); Jörg Neubert, Heilbronn (DE); Friedrich Behr, Aachen (DE); Stefan Kaierle, Herzogenrath (DE)

(73) Assignees: Fraunhofer Gesellschaft zur Förderung der angewandten Forschung e.V., München (DE); Thyssen Laser-Technik GmbH, Aachen (DE); ThyssenKrupp Drauz Nothelfer GmbH, Heilbronn (DE)

( * ) Notice: Subject to any disclaimer, the term of this patent is extended or adjusted under 35 U.S.C. 154(b) by 379 days.

(21) Appl. No.: 10/471,547

(22) PCT Filed: Mar. 7, 2002

(86) PCT No.: PCT/DE02/00818

§ 371 (c)(1),
(2), (4) Date: Feb. 16, 2004

(87) PCT Pub. No.: WO02/072304

PCT Pub. Date: Sep. 19, 2002

(65) Prior Publication Data

US 2006/0151452 A1     Jul. 13, 2006

(30) Foreign Application Priority Data

Mar. 13, 2001  (DE) .............................. 101 12 445

(51) Int. Cl.
*B23K 26/38*     (2006.01)
*B23K 26/03*     (2006.01)

(52) U.S. Cl. ..................... 219/121.72; 219/121.83; 700/166

(58) Field of Classification Search ........... 219/121.67, 219/121.72, 121.83, 121.63, 121.64, 121.84; 700/166

See application file for complete search history.

(56) References Cited

U.S. PATENT DOCUMENTS 5,685,999 A * 11/1997 Wiedemann et al. .. 219/121.83

(Continued)

FOREIGN PATENT DOCUMENTS

JP          61-226217 A   * 10/1986

(Continued)

*Primary Examiner*—Geoffrey S. Evans
(74) *Attorney, Agent, or Firm*—Gudrun E. Huckett

(57) ABSTRACT

In a method for cutting structural components to be joined by laser radiation that is guided by a computer-controlled manipulation system provided with a nominal path for each structural component corresponding to a joining line that is curved as a result of at least one of the structural components being three-dimensionally shaped, the structural component surfaces of the structural components including the joining line are determined measuring technologically. Based on measuring results, the nominal path corresponding to a penetration line of the structural components to be joined is calculated. A marking is formed on a first one of the structural component surfaces. When performing the cut on the structural component surface provided with the marking, the resulting cutting gap and the marking are determining measuring technologically. When a deviation of the cutting gap from the nominal path is detected, the manipulation system is controlled to correct the deviation.

11 Claims, 4 Drawing Sheets

U.S. PATENT DOCUMENTS 5,777,880 A * 7/1998 Bowen et al. .................. 83/74

FOREIGN PATENT DOCUMENTS

| JP | 62-259011 A | * | 11/1987 |
| JP | 4-269198 A | * | 9/1992 |
| JP | 8-300178 A | * | 11/1996 |
| JP | 9-155579 A | * | 6/1997 |

* cited by examiner

METHOD FOR LASER-CUTTING STRUCTURAL COMPONENTS TO BE JOINED

BACKGROUND OF THE INVENTION

The invention relates to a method for cutting structural components to be joined by laser radiation, guided by means of a computer-controlled manipulation system that has preset a nominal path for each structure structural component, wherein the nominal path corresponds to a joining line that is curved as a result of at least one especially three-dimensionally shaped structural component.

DE-Z TechPress 1/97, pp. 21 through 26, discloses a method for cutting structural components to be joined by means of laser radiation, wherein a cutting head of a laser cutting device emitting laser radiation is guided by means of an automated manipulation system. Guiding is carried out along a predetermined nominal path.

When cutting is carried out in order to produce structural components to be joined, the nominal path must correspond as precisely as possible to the joining line. When the structural components are to be joined at curved joining lines, for example, by means of welding with high-energy radiation, such as laser radiation, the manipulation system during cutting of each one of the structural components to be joined must effect a path of the laser radiation which corresponds as precisely as possible to the curved joining line. A plurality of error sources can impair the precision. The shaping of the structural components to be joined and the path precision of the manipulation system should be mentioned as examples. Moreover, the method should provide a production output as high as possible so that high cutting and welding speeds are desired. The quality of the welding connection, however, should not suffer so that the cutting gap width and the welding seam width must be maintained within predetermined limits. For the aforementioned reasons, it is required to cut the structural components to be joined as precisely as possible.

DE 38 18 402 C1 discloses a method for torch cutting where the penetration line of two bodies is measured based on their actual dimensions. For this purpose, a predetermined area is assigned to both bodies, respectively, which area comprises the penetration line. Measured values of both areas are saved and, based on these values, the penetration line is calculated according to which the welding seam is then produced. The use of a computer-controlled manipulation system in interaction with a laser beam is not disclosed. During cutting no correction whatsoever of the torch cutting machine is carried.

U.S. Pat. No. 5,463,202 describes a method for processing workpieces by laser radiation wherein secondary light originating at the work location is determined and supplied to a control device that loads an NC device provided for controlling a worktable supporting the workpiece. Guiding of the laser radiation by means of a computer-controlled manipulation system is not carried out.

SUMMARY OF THE INVENTION

The invention has therefore the object to improve a method of the aforementioned kind in the sense of a precise cutting to size.

The object is solved in that surfaces of the structural components comprising the joining line are measuring-technologically determined and, based on measuring results obtained thereby, the nominal path corresponding to a penetration line of the structural components is calculated, in that on a structural component surface, upon which the measuring-technological determination is based, a marking of this structural component surface is carried out, in that during cutting of a structural component the resulting cutting gap and the marketing of the structural component surface are determined measuring technologically, and in that the manipulation system in the case of a deviation of the cutting gap from the nominal oath during cutting is controlled in this sense of a correction of this deviation.

It is important in connection with the invention that at least the surface sections of the structural components are measured which are to be provided with the joining line. As a result of this, structural components which are not precisely known with regard to their geometric shape can be precisely determined. Based on the precision of the measuring results, a penetration line can then be calculated that is common to both structural components to be joined. The nominal path corresponds to this penetration line and can thus be precisely determined by computation. Imprecisions as a result of a premanufacturing step of the structural components have no effect on the precision of the cut because of their measuring-technological determination. Moreover, for the invention it is important that a marking of the structural component surface that has been measuring-technologically determined is carried out. Such a marking serves for referencing that must be performed so that a sensor during cutting of a structural component can detect the resulting cutting gap with regard to its size and position in an error-free way, i.e., free of correlation errors between the detected cutting geometry and the nominal path. The measuring-technological detection of the resulting cutting gap can thus be precise enough in order to control the manipulation system in the case of a deviation of the cutting gap from the nominal path such that a correction of the deviation is achieved during cutting.

The method is carried out such that the marking of the measuring-technologically determined structural component surface is carried out simultaneously with its measuring-technological determination. Since marking is carried out during the measuring process, marking errors are avoided which could occur for a time-delayed marking, for example, because of the time delay of different measuring and marking parameters.

It is preferred that marking is carried out by the laser carrying out the cutting of the structural component. It is therefore not to be expected that errors will occur during marking which could result from spatially different positioning of the laser and a special marking instrument. Also, errors are avoided which could result from different dynamic behavior of the laser and a marking element.

Moreover, it is preferred that the marking is carried out on the nominal path or in its vicinity. This primarily achieves that the area to be observed can be kept small. This is advantageous in order to be able to employ sensors of a less complex configuration and in order to keep the computation expenditure minimal. Moreover, this provides the possibility of operating at high cycle times for a predetermined computation expenditure; this is advantageous for a precise correction of deviations during cutting or enables a higher cutting speed.

In the above described sense, it is moreover advantageous when the markings are formed only at some locations.

The aforementioned fast correction or a time-optimized performance of cutting can be improved in that the marking is in the form of the cutting gap that is produced during cutting. However, this requires a sufficiently reliable path behavior of the manipulation system, for example, with regard to kinetics, dynamics, and thermal effects so that a tolerable cutting gap width will not be surpassed. The same holds true to a lesser degree also for the aforementioned method variant wherein the markings are carried out only at some locations. The reliability of the path behavior entails that referencing of the nominal path is required only in intervals.

The method can be improved in that the same sensor is employed for the measuring technological detection of the marking and of the cutting gap. This simplifies not only the configuration of a device that is required for performing the method but also avoids errors which are to be expected as a result of a complicated configuration of the device with different sensors, for example, because of a different arrangement and, accordingly, different measuring positions of several sensors.

When performing the method, it can also be advantageous when a sensor employed for a measuring technological determination is an imaging sensor. An imaging sensor facilitates particularly, on the one hand, to enable with minimal constructive expenditure simultaneously the measuring technological determination of the structural component surface and its marking as well as the detection of this marking and of the effective course or the resulting cutting gap.

In order to employ a proven technology in the method, it is proposed that the sensor for the measuring-technological determination is a CCD camera. The data recorded with the CCD camera can be processed with proven image evaluation methods and can be integrated into already existing computers and control devices. Instead of a CCD camera, other imaging sensors can be used which are, for example, a CMOS camera or a PSD sensor.

In order to obtain a reliable measuring result of two or several structural components with regard to their relative position in the joining situation, the method can be performed such that the structural components for a measuring-technological determination of their structural component surfaces are positioned in a predetermined relative arrangement. This predetermined relative arrangement can be adjusted, in particular, relative to their future joining position, wherein one structural component can have a position which it later would assume for joining while another structural component or several other structural components must be removed from their joining position only so far as required by the structural component rests to be cut off, as long as the manipulation device enables such an arrangement without undesirable interference of the remaining method sequence.

For performing a measuring technological determination of two structural component surfaces, it can be advantageous to perform the method such that for a measuring technological determination of two structural component surfaces two distance measuring devices are used that are positioned at a predetermined relative arrangement to one another. The relative arrangement of the distance measuring devices to one another can be predetermined such that it is adjusted to the relative arrangement of positioning of the structural components for the measuring-technological determination of their structural component surfaces according to the afore described method. The predetermined relative arrangement of two distance measuring devices enables moreover the simultaneous detection of two structural component surfaces including optionally also the formed markings provided thereon. Therefore, errors cannot occur which possibly are to be expected for an arrangement of a single distance measuring device when it is sequentially aligned relative to both structural component surfaces and employed for a measuring technological determination.

BRIEF DESCRIPTION OF THE DRAWINGS

The method according to the invention will be explained in more detail with the aid of the illustration in the Figures. It is shown in.

DESCRIPTION OF PREFERRED EMBODIMENTS

Figure 1:
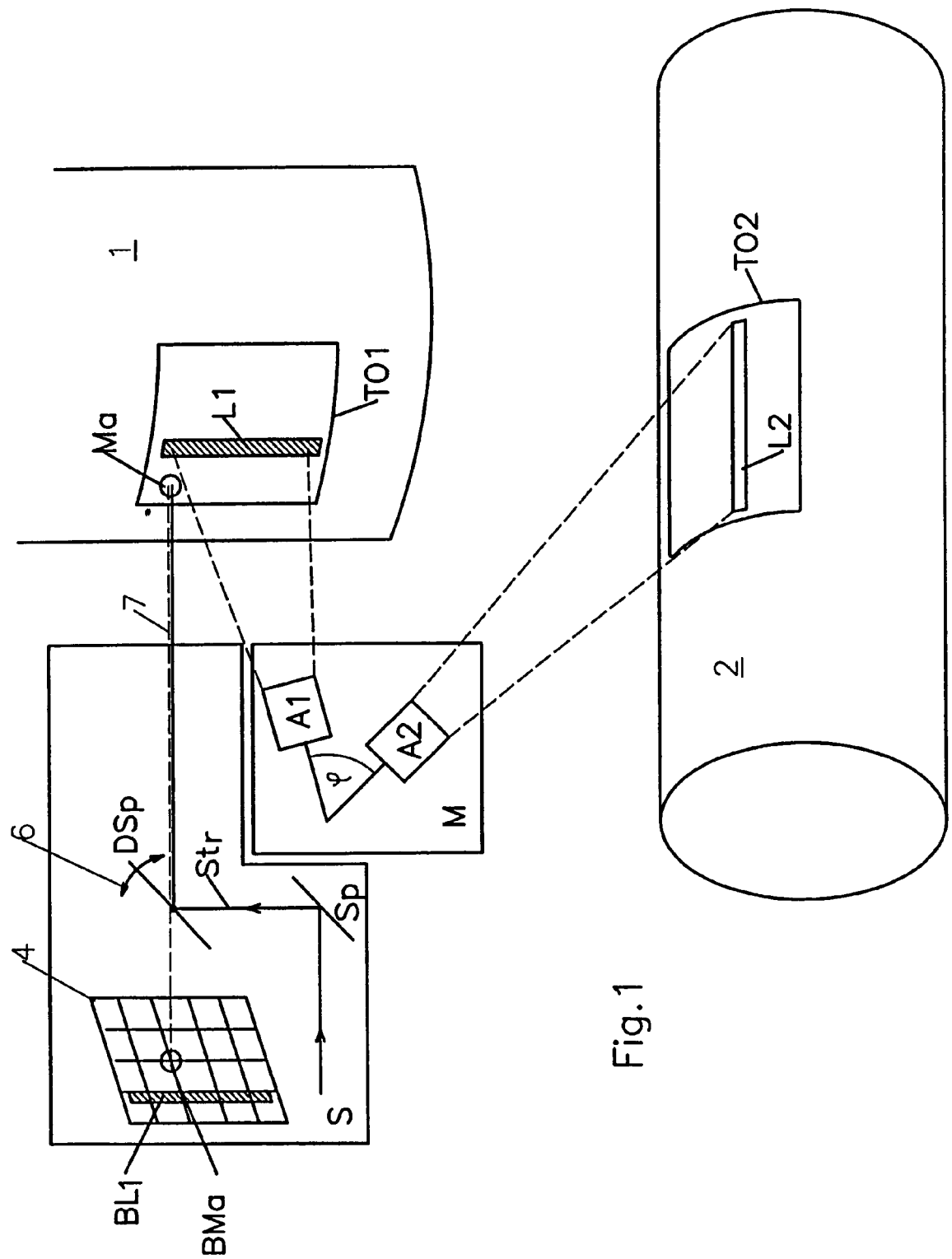
FIG. 1 a schematic arrangement of all components required for performing the method.

In FIG. 1, two structural components 1, 2 are schematically illustrated. Both are illustrated as being tubular; however, the tubular configuration is not important—in place of it, other three-dimensional structures are also suitable. In particular, one of the structural components 1, 2 is three-dimensional in such a way that a three-dimensional curved joining line results when the two structural components 1, 2 are to be connected to one another by welding.

The embodiment of the structural components 1, 2 as regards their shape is as needed, for example, structural components can be employed which are used for filling truss structures wherein butt seams, for example, between pipes or profiled sections used as frames and, for example, flat elements as filling structures are welded together. Also, IHT structural components can be used which, are produced by internal high-pressure transforming (IHT) and, in connection with space-frame concepts, are welded by means of buckling arm robots. In the context of space-frame concepts, structural components made of steel can be produced also. Also, structural components of easily deformable materials can be employed, for example, aluminum. The connection between these structural components is produced by welding and without, for example, preparative work such as edge-forming and without forming during the joining process, for example, by pressing for the purpose of a shape-transforming adaptation. The aforementioned structural components are used, for example, in the automotive industry, in prototype construction, as well as custom-made constructions.

The structural components 1, 2 are positioned in FIG. 1 in a predetermined relative arrangement wherein the structural component 1 is in a fixed position that during cutting and during joining remains unchanged. The cutting step is carried out for the purpose of a spatial adaptation of the structural component 1 to the outer circumference of the structural component 2 wherein the latter, according to FIG. 2, can be moved from a position A by a predetermined displacement V into a position E at the end face 5 of structural component 1 in order to perform the joining step.

In order to be able to match the end face 5 of the structural component 1 to the outer circumference of the structural component 2 as precisely as possible, the structural components 1, 2 must be precisely known at least in those structural component areas which are to be joined. For the structural component 1, the structural component surface T01 is schematically indicated here, and the structural component surface T02 of the structural component 2 is indicated. In the area of these surfaces T01, T02 the joining line is to be formed.

Positioning of the structural components 1, 2 can be combined with its manufacture. The structural components 1, 2 are manufactured, for example, by shaping. In this connection, the structural components are fixed in position, for example, by fixation bolts of the shaping tool during the shaping process. The fixation bolts engage reference bores of the structural components 1, 2 in order to secure the position of the structural component. By means of the reference bores the arrangement of the structural component 1, 2 is defined. In the initial position illustrated in FIG. 1, the tailoring cut is performed on the structural component 2, and in the end position of the structural component 2, which, according to FIG. 2, can be derived from the indicated displacement from A to E, a predetermined gap width between the two structural components 1, 2 should not be surpassed. The acceptable gap width between a cutting edge of the structural component 1 and of the outer circumference of structural component 2 is determined by the capability of the welding arrangement for bridging such gaps. Modern Nd:YAG lasers can bridge gap widths up to 100 μm.

In order to be able to determine the configuration of the structural components 1, 2, a measuring device M is provided. By means of the measuring device at least those structural component surfaces T01 of the structural component 1 and T02 of the structural component 2 must be determined measuring technologically in which the joining line is to be formed, i.e., where the structural components 1, 2 are to be welded to one another. It is assumed in this connection that the structural components 1, 2 are positioned in a predetermined relative arrangement relative to one another as illustrated schematically in FIG. 1. Under these conditions, two distance measuring devices A1, A2 can be used that are also positioned in a predetermined relative arrangement to one another determined by the angle size Φ in FIG. 1. The distance measuring devices A1, A2 have measuring lasers which can generate on the structural component surfaces T01, T02 a linear focus L1, L2, respectively. When carrying out the distance measurement, surface scans can be performed for generally known measuring methods in different ways. Measurement can be carried out by triangulation, holography, or interpherometry. Different measuring signals can be used, for example, in accordance with white light or radar interpherometry. Different detection devices can be used, for example, CCD cameras, CMOS cameras or PSD sensors. The obtainable precision is estimated, for example, in the case of the triangulation method, to be one per thousand. The interpherometry methods can achieve a precision within the micrometer range. The actual precision depends, however, strongly on the boundary conditions, for example, soiling of the structural components to be measured.

Figure 2:
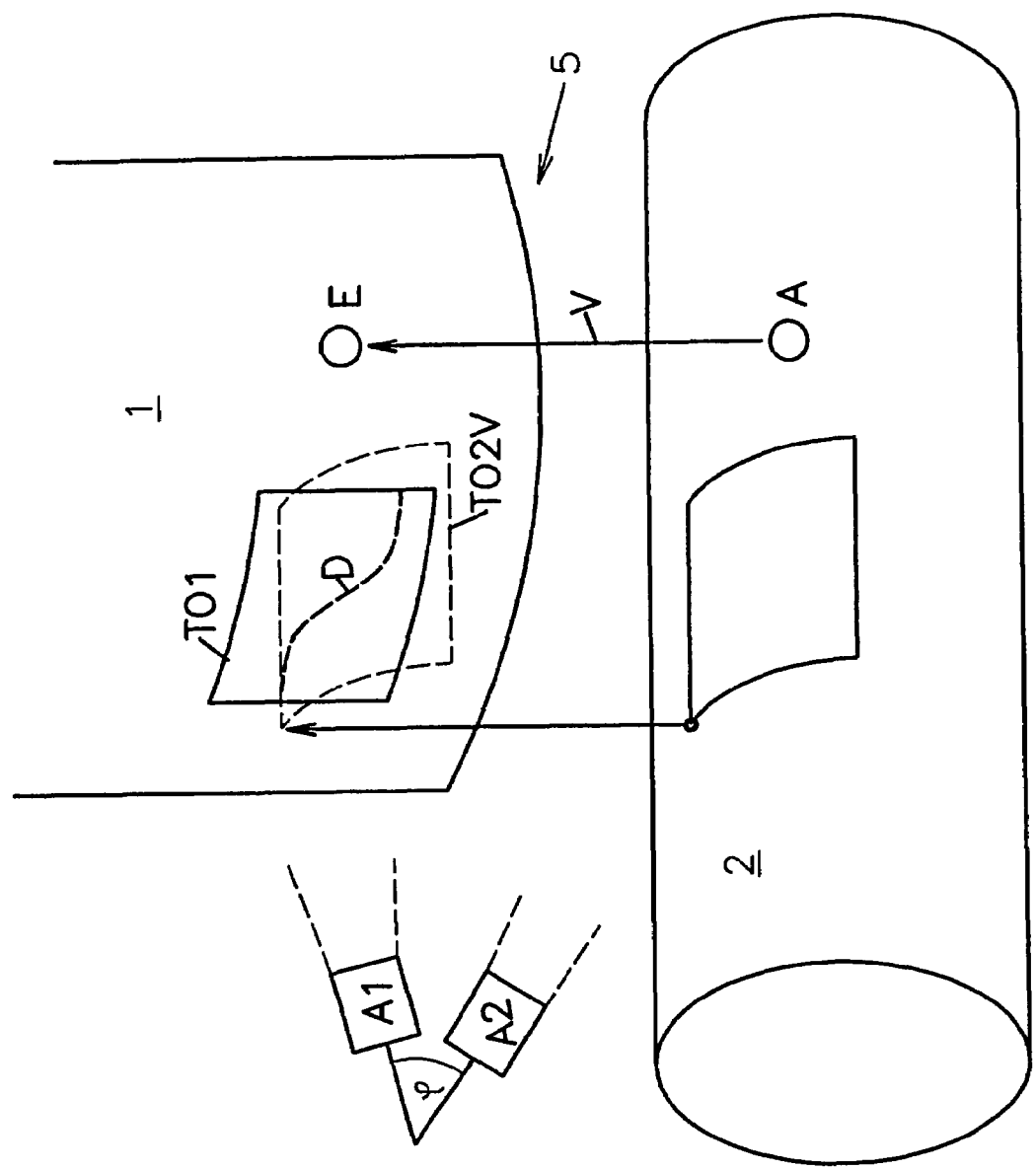
FIG. 2 an illustration for determining a nominal path.
Figure 3:
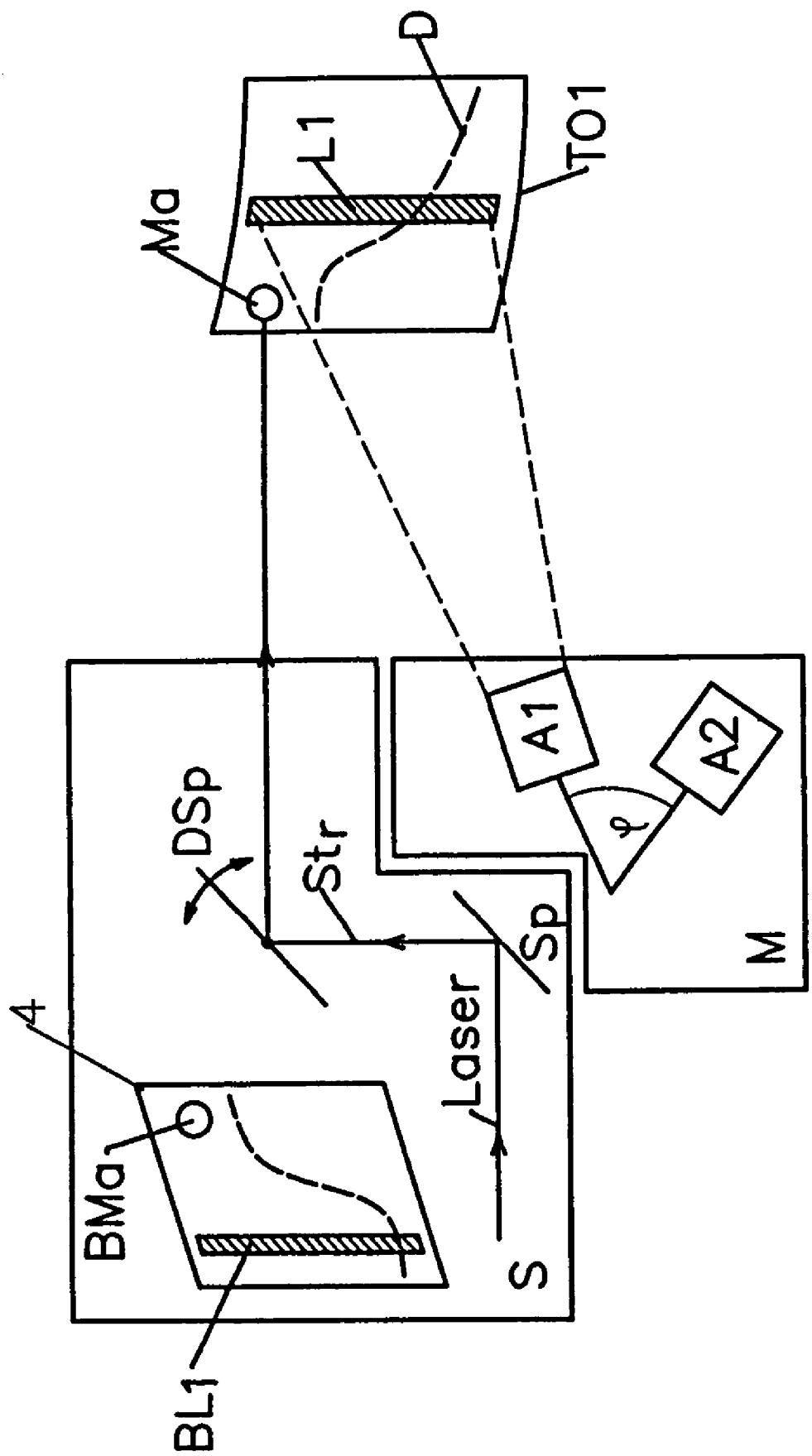
FIG. 3 an illustration for explaining the transfer of data of a measuring technologically determined structural component surface and a measuring-technologically determined marking on an imaging sensor.
Figure 5:
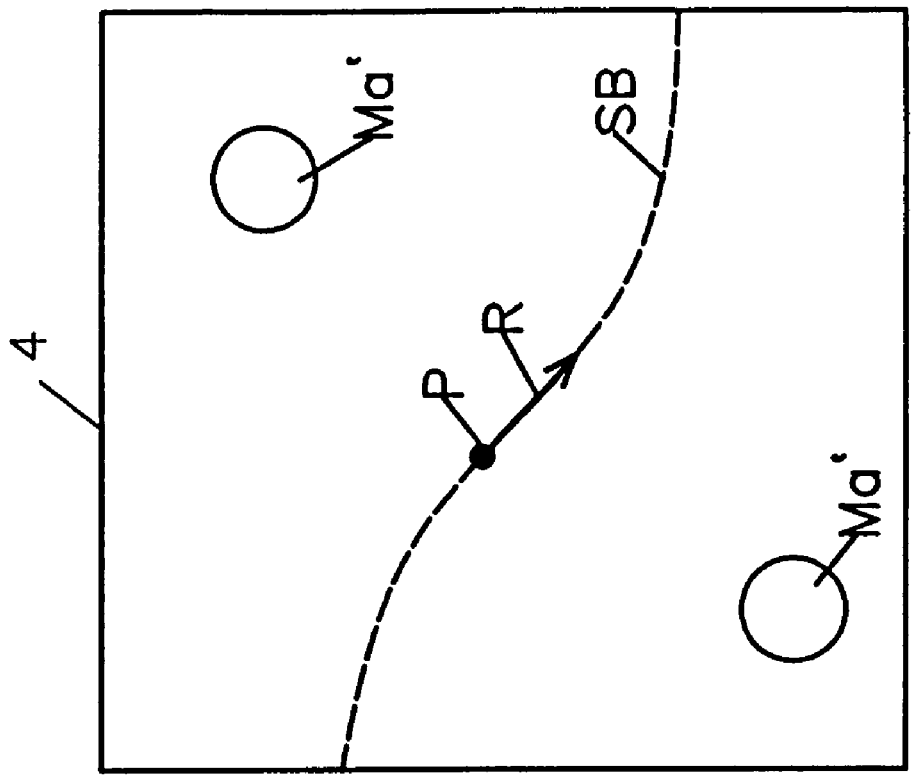
FIG. 5 a calculated structural component surface that is used for forming the cutting gap.
Figure 4:
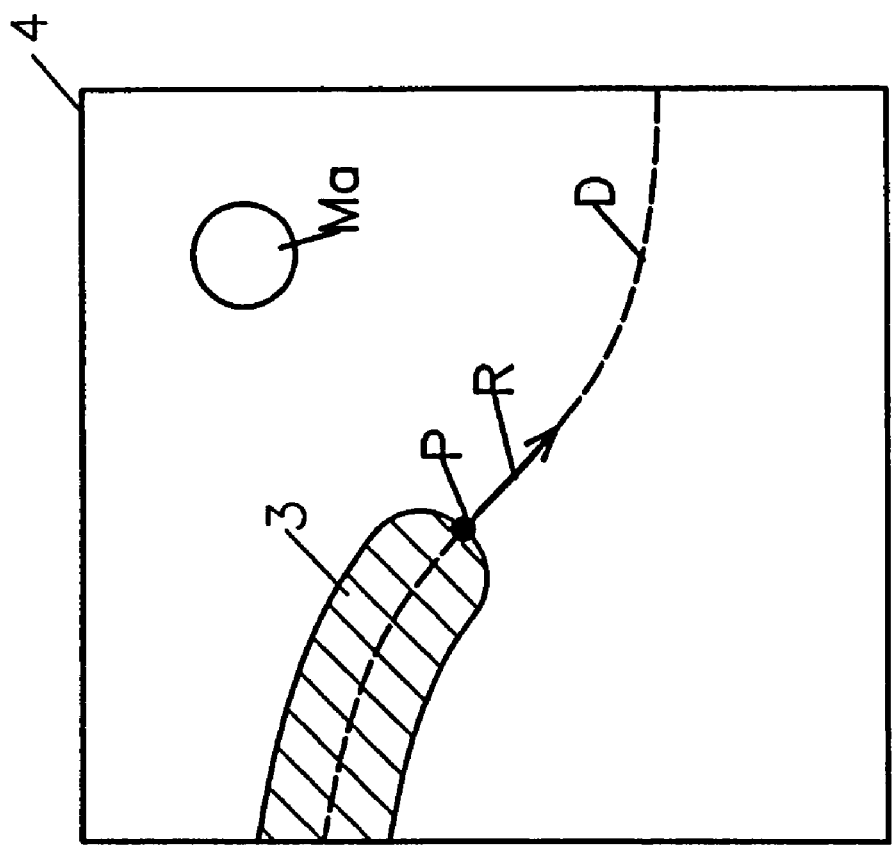
FIG. 4 a schematic illustration of a cutting gap produced during cutting.

By means of the measured results for the structural component surfaces T01, T02 comprising the joining line, the penetration line D of the structural components 1, 2 can be calculated when talking into consideration the displacement of the structural component 2 from A to E so that the structural component surface T02 is in the displacement position T02V illustrated in FIG. 2. The penetration line D is theoretically that position which the joining line assumes in the ideal situation and corresponds thus to a nominal path SB, as illustrated schematically in FIG. 5. The nominal path serves for controlling the cutting process in the case of the concrete structural components 1, 2 and can be different for a different structural component pair made by an identical manufacturing processes.

For performing cutting of the structural components 1, 2, a cutting system S is provided. It is comprised essentially of a manipulation system with a laser and can be provided with the measuring device M. As a manipulation device, all known systems can be used, for example, buckling arm robots. The system comprises a beam deflection system, characterized in FIG. 1 by a rotary mirror DSp, to which rotary mirror DSp a laser beam emitted by a laser is guided via a deflection mirror Sp. The rotary mirror can be comprised of dichroitic material which reflects laser radiation coming from a Nd:YAG laser and accordingly deflects it onto the structural component. In FIG. 1, the double arrow 6 indicates that the rotary mirror DSp is able to perform beam deflections. This movement can be carried out independent of possibly occurring movements of the manipulation system, i.e., in addition thereto. In this way, imprecise movements of the robot axes during cutting can be compensated, for example, during cutting of contours with small radii. In this way, the path precision is increased. Within the range of movability of the rotary mirror DSp, movements of robot axes during cutting can also be prevented entirely.

For performing the afore described cutting process, the cutting system S is provided with a sensor 4. The sensor 4 is used for the measuring-technological determination of the surfaces T01, T02. During the measuring technological detection for determination of the surface of the structural component 1, the sensor 4 detects the image BI1 of the line focus L1. As a result of this, by employing the measuring results of the distance measuring device A2 and by means of the computer (not illustrated) that knows the nominal path SB, the sensor 4 is able to detect and measure the penetration line or the joining line during welding. Accordingly, it is possible to monitor the joining line as well as the cutting gap of the structural component 1 during cutting by means of the sensor 4 by referencing the nominal path SB.

The sensor 4 is an imaging system, i.e., a CCD camera. The CCD camera observes particularly the structural component surface T01 to be determined measuring technologically. Required for the measuring technological determination is that the signals of the process are received and transmitted to the computer (not illustrated) where they are processed. In the imaging method, the viewing orientation of the camera can be important. The viewing orientation of the CCD camera according to FIG. 1 is coaxial to the laser beam. With regard to this, the rotary mirror DSp is able to allow penetration of the secondary radiation reflected on the structural component 1. The sensor 4 can thus determine heat radiation emitted by T01 because it is not reflected by the rotary mirror DSp. As a result of this, it is possible to observe a welding seam during joining or a cutting gap 3 during cutting of the structural component by means of the CCD camera or the sensor 4.

In order to ensure a precise determination of the structural component surface T01, it is necessary to reference the CCD camera. Referencing is carried out by providing on the structural component 1 a marking Ma on the structural component surface T01 at a predetermined relative arrangement of the structural component 1 and of the manipulation system or the cutting system S. The marking Ma is generated by means of the processing laser that is also used for cutting the structural component 1. The resulting reflected radiation 7 penetrates the rotary mirror DSp and generates on the sensor 4 the image BMa of the marking Ma. Since the spatial arrangement of the measuring system M and of the cutting system S, on the one hand, and of the structural component 1, on the other hand, are known, the image BL1 of the line focus L1 therefore has a known spacing from the image BMa of the marking Ma; this is the prerequisite for the above-mentioned computational precise determination of the penetration line D or the joining line and also of the nominal path SB. The computer has available in the predetermined range the precise position Ma' of the marking Ma. By means of observing the marking Ma, it is therefore always possible to determine which actual position the cutting gap 3 or a joining line has on the structural component 1. By means of the sensor 4, it is thus always possible according to the standard of the reference image 4' according to FIG. 5 to provide a precise monitoring of the actual processing step, for example, of the cutting step. The nominal path SB is always known with regard to its location P and its directional vector R so that the presence of these parameters P, R during machining can always be monitored. In the case of a deviation from the nominal path SB or of the aforementioned parameters P, R during processing, a control of the manipulation system in the sense of correction of this deviation is carried out.

The afore described method and its variant serve for a precise cutting of a structural component as a preparation for a precise joining with a second structural component and as a preparation for the subsequent welding along a joining line precisely determined by the cutting step. At least one of the structural components has a three-dimensional shape which is however not precisely known beforehand. As a result of this, the cutting contour and the slant of the cutting edge are not predetermined with the required precision. As a result of the unknown geometric shape of the structural components to be joined and as a result of the unknown position of the manipulation device for guiding a radiation source or for guiding the laser beam, during machining corresponding imprecisions will be caused that must be measured. Even though the nominal path for processing is not predetermined and must be measured, and even though the required upper limit for the deviation from the nominal path of the joining gap or of the cut edge resulting from cutting is smaller than the path deviation of the controlled manipulation system, with which the cutting tool and the measuring system are guided, predetermined precisions of, for example, less than 100 µm joining gap width can be observed. Path deviations between the cutting gap and the nominal path are determined at a high repetition rate during the cutting process and determined within predetermined limits independent of the position and of the movement of the manipulation system.

Quality and output of the imaging system are determined by the level of the spatial and temporal resolution. A high spatial resolution enables an enlargement of the image section and thus an even more precise control. A high temporal resolution enables higher cutting speeds and thus a higher production, even for complex structural component contours. The precision can be increased such that, for example, overlap seams or edge-formed seams requiring an increased expenditure for seam preparation and having a reduced strength in comparison to butt seams are no longer needed.

It is important that during the measuring process, i.e., during the measuring technological determination of the structural component surface T01, a marking is generated. Above, the formation of a single marking Ma has been described. Markings, however, can also be repeated when a complex geometry of the structural component 1 requires this. Such markings are generated along the nominal path or in its vicinity so that it can be easily observed with the imaging system. Such markings can be referred to as a measuring technologically detected link by which a repeated or continuous referencing of the sensor 4 is possible.

What is claimed is:

1. A method for cutting by laser radiation structural components to be joined, wherein the laser radiation is guided by means of a computer-controlled manipulation system, the method comprising the steps of:
    a) determining measuring technologically structural component surfaces of the structural components to be joined along a joining line located within the structural component surfaces, wherein at least one of the structural components is three-dimensionally shaped causing the joining line to be curved;
    b) calculating, based on measuring results obtained in the step a), a curved three-dimensional penetration line of the structural components when joined in an ideal position along the joining line and a nominal path for each structural component corresponding to the penetration line;
    c) providing a marking on one of the structural component surfaces;
    d) performing by laser radiation a cut on the structural component surface provided with the marking;
    e) when performing the cut, determining measuring technologically a resulting cutting gap and the marking and comparing the cutting gap and the nominal path, using the marking as a reference;
    f) when a deviation of the cutting gap from the nominal path is detected in step e), controlling the manipulation system to correct the deviation.

2. The method according to claim 1, wherein the step c) and the step a) are carried out simultaneously.

3. The method according to claim 1, wherein the marking is formed by a laser performing the cut in step d).

4. The method according to claim 1, wherein the marking is formed on the nominal path or in the vicinity of the nominal path.

5. The method according to claim 1, wherein the marking is formed only at some locations.

6. The method according to claim 1, wherein the marking is the cutting gap.

7. The method according to claim 1, wherein in the step e) one and the same sensor is used for determining measuring technologically the marking and the cutting gap.

8. The method according to claim 1, wherein in the step a) and the step e) an imaging sensor is used for measuring technologically determination.

9. The method according to claim 8, wherein the imaging sensor is a CCD camera.

10. The method according to claim 1, wherein in the step a) the structural components are positioned in a predetermined relative arrangement to one another.

11. The method according to claim 1, wherein in the step a) two distance measuring devices are employed and are positioned in a predetermined relative arrangement to one another.

* * * * *